Aug. 7, 1951     M. C. FUQUA ET AL     2,563,598
REMOVAL OF PEROXIDES FROM HYDROCARBONS
AND OXYGENATED SOLVENTS
Filed March 31, 1948
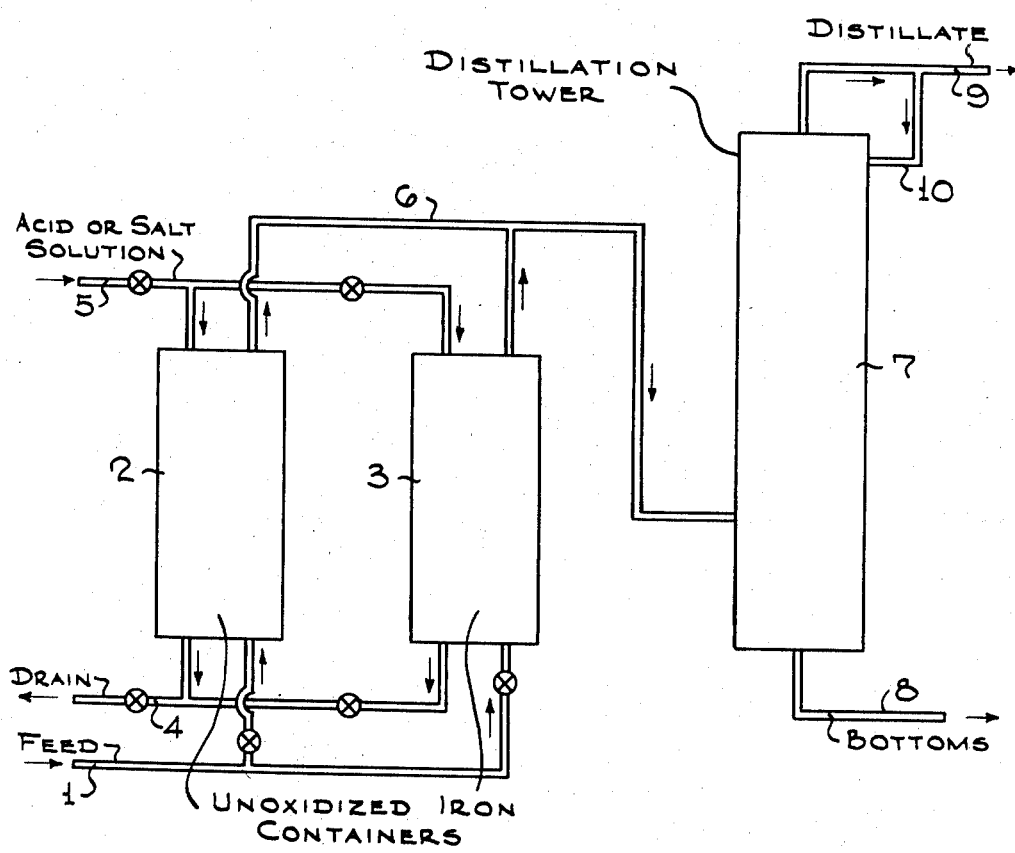
Mack C. Fuqua
Bowman G. Garrett    Inventors
By   *Henry Berk*   Attorney

Patented Aug. 7, 1951

2,563,598

UNITED STATES PATENT OFFICE 2,563,598

REMOVAL OF PEROXIDES FROM HYDROCARBONS AND OXYGENATED SOLVENTS

Mack C. Fuqua, Baton Rouge, La., and Bowman S. Garrett, Bellerose, N. Y., assignors to Standard Oil Development Company, a corporation of Delaware Application March 31, 1948, Serial No. 18,278

10 Claims. (Cl. 260—681.5)

This invention relates to the removal of peroxides and similar unstable oxy-compounds from mixtures of hydrocarbons and oxygenated organic compounds, and particularly to the removal of peroxides from a mixture of hydrocarbons that contains easily polymer forming compounds.

In the separation and segregation of diolefins from other hydrocarbons, such as in an absorption of a desired diolefin from a mixture of hydrocarbons followed by a heating step to liberate the desired diolefin from the absorbent after it has been separated from the other constituent, various types of polymers are formed, such as dimers, viscous high molecular weight polymers, solid polymers, and semi-solid or resinous polymers. The dimers and low molecular weight polymers are generally soluble in diolefin, etc., or other hydrocarbons, and in certain cases are depolymerized upon heating to the original diolefin. On the other hand the solid polymers that are formed are quite insoluble in the diolefin, or other hydrocarbons and as a result of the formation of the solid polymers the distillation columns and other plant equipment become filled with the solid polymers with a resulting interference in the operation of the still, or other equipment. It is necessary to remove these polymers by mechanical means and even though the complete equipment is thoroughly cleaned, it is only a matter of time before the polymers again grow sufficiently to foul and plug the equipment. Two remedies are advanced, one is the prevention of initial formation of the polymers, and two, the inhibition of the growth of the polymer.

According to this invention, the initial formation of the polymer is reduced when the mixture of hydrocarbons and oxygenated material is contacted with a finely divided iron which has a fresh unoxidized metallic surface. The metallic surface can be regenerated by removal of its oxidized (spent) surface by treatment with ferrous sulphate solution, or dilute mineral acid, followed by a water rinse.

The rate of decomposition of the peroxides in the organic materials treated with the finely divided iron increases rapidly as the temperature rises. For example, an acetone solution of isoprene which is obtained by adding acetone to a mixture of saturated and unsaturated hydrocarbons and distilling overhead the olefins and retaining absorbed isoprene in the acetone as bottoms, upon contacting with a fresh metallic iron surface shows the following results:

| Sample | Temperature | Contact Time [1] | P. P. M. Peroxide Oxygen |
|---|---|---|---|
| | ° C. | Min. | |
| Original | | | 16 |
| A | 30 | 2 | 14 |
| B | 60 | 2 | 5 |

[1] Steel wool.

Temperatures above 30° C. are preferably used to remove the peroxide oxygen, and high temperatures of 175° C. and higher were found to be very effective.

In another sample 20 P. P. M. of peroxide oxygen was added to an acetone solution of isoprene containing 25 wt. % of C₅ hydrocarbons, and 75 wt. % of aqueous acetone (95% concentration). This mixture of acetone and C₅ hydrocarbons was contacted with steel wool at about 35° C. An analysis of the treated mixture for active oxygen at the end of 36 hours showed reduction to 2 P. P. M. of residual peroxide oxygen.

In another embodiment of this invention it was found higher temperatures are desirable, for example, when two vessels were placed in parallel through which was circulated a mixture of unsaturated hydrocarbons having 4 to 7 carbon atoms to the molecule containing easily polymer forming compounds and peroxides passing to a distillation tower. The feed stream containing butadiene, isoprene, and some higher diolefins was first passed through one of two vessels containing steel wool. The two vessels and the distillation tower were heated with steam coils to a temperature of 160° C., at a pressure of 160 lbs. per square inch gauge. Several runs were made, and it was noted that the steel wool became oxidized indicating removal of oxygen from hydrocarbon mixture. No peroxide measurements were obtained because of the very low oxygen concentrations in the hydrocarbon stream. Polymer formation on the steel wool was excessive in each run with reduced polymer formation in the vessel following the steel wool containing vessel. It was noted that the polymer formation is less on alloys that do not have a coating of iron oxide, and it is therefore, concluded that iron oxide initiates the polymerization of certain fractions of highly unsaturated hydrocarbon streams, and it is possible to reduce polymer formation in a specific vessel by preceding it with a vessel containing steel wool, or some other finely divided fresh or unoxidized iron. This offers certain advantages over chemical treatment, since a finished product would have to be rerun if chemical treatment were used. This process is particularly adapted to be used to remove peroxides from hydrocarbon fractions having four or more carbon atoms to the molecule.

The invention will be more fully understood by referring to the accompanying drawing in which preheated unsaturated hydrocarbons having 4 or more carbon atoms to the molecule and containing conjugated diolefins such as isoprene are introduced by means of pipe 1, into either one or both of unoxidized iron containers 2 and 3, where they are contacted with unoxidized iron surfaces at a temperature of about 140° C. and at the vapor pressure of the mixture and maintained at that temperature for one hour. The hydrocarbons are then passed through pipe 6 to a distillation or extraction tower 7 to separate the diolefins from the olefins, the olefins being recovered overhead by means of pipe 9 provided with reflux stream 10, and the diolefins being removed as bottoms by means of pipe 8 from tower 7. The iron may be regenerated by washing with an acid, or a ferrous sulphate solution by means of pipe 5, in containers 2 and 3, the wash solution being removed through pipe 4. Containers 2 or 3 may be alternatively regenerated while one is being used, to remove the peroxide from the hydrocarbon solution.

In a system such as that described above distillation tower 7 used for distilling treated material will contain less polymer than such tower used for distilling untreated material. At temperatures of 30° C. some peroxide oxygen is removed although at higher temperatures more peroxide oxygen is removed and temperatures of 100° C. and higher are preferred. This method of removing peroxide oxygen is suitable for treating any organic solution containing undesirable peroxides and is not limited to butadiene and isoprene containing solutions.

In the treatment of a diolefin hydrocarbon stream, e. g. a stream of butadiene, which has a strong tendency to form polymers when the stream is heated to its distillation temperature under superatmospheric pressures, it is deemed advantageous to have the stream contain a trace of water as it is contacted with the finely divided iron. The trace of water may form some active catalytic oxide centers on the finely divided iron and thus bring about a selective polymerization of the unsaturated hydrocarbon contaminants that have a stronger polymerizing tendency. The substantial portion of the iron surfaces exposed to the hydrocarbon stream during treatment essentially has to be unoxidized. When the mass of solid material bearing the unoxidized iron surfaces has been exposed to the hydrocarbons over a period of time sufficient to oxidize substantially all of the iron surfaces it loses its effectiveness and has to be regenerated or replaced.

What is claimed is:

1. The method of purifying an oxygenated organic solution containing diolefinic hydrocarbons which readily form polymers and contaminated by organic peroxides, which comprises removing the said contaminating organic peroxides from the organic oxygenated solution containing the diolefinic hydrocarbons by passing said solution into contact at a temperature of at least 30° C. and in the presence of only a small amount of water in said solution with a mass of finely divided iron having unoxidized iron surfaces.

2. The process of purifying a hydrocarbon mixture containing diolefinic hydrocarbons having at least four carbon atoms per molecule and which readily form polymers, said mixture containing organic peroxide contaminants, which comprises contacting said hydrocarbon mixture containing said diolefinic hydrocarbons and said peroxide contaminants with a mass of finely divided iron having unoxidized surfaces in the presence of only traces of water at a temperature of at least 30° C., whereby said organic peroxide contaminants are substantially eliminated.

3. A method of purifying a hydrocarbon mixture containing butadiene and peroxide present as oxy-organic contaminants, which comprises contacting the hydrocarbon mixture with a mass of finely divided iron having unoxidized iron surfaces in the presence of only traces of water and at a temperature of at least 30° C.

4. The method for handling diolefinic hydrocarbons contaminated with organic peroxide impurities, said hydrocarbons normally forming solid polymers upon heating in the presence of said organic peroxides, which comprises contacting said peroxide-contaminated hydrocarbons with a mass of finely divided metal having unoxidized iron surfaces at a temperature of at least 30° C. in the presence of only traces of water, separating the peroxide-free diolefinic hydrocarbons from said mass of finely divided metal, and periodically removing from the separated metal the combined oxygen from the surface of the mass of finely divided metal by treatment of said metal with a solvent.

5. The method according to claim 4 in which the solvent is ferrous sulfate.

6. The method according to claim 4 in which the solvent is sulfuric acid.

7. The improved method of handling a stream of a diolefinic hydrocarbon which tends to form solid polymers on distillation temperature with unstable organic peroxide contaminants present, which comprises passing a stream of the diolefinic hydrocarbon contaminated by the peroxide through a treating zone containing a mass of finely divided iron having essentially unoxidized iron surfaces in the presence of only a trace of water and at a temperature above 30° C. and in a single liquid phase, thereby removing said organic peroxide contaminants and depositing polymers formed from said diolefinic hydrocarbons on said iron surfaces, and withdrawing from said treating zone a stream of the diolefinic hydrocarbon freed of peroxide contaminants and stabilized against the polymer formation at its distillation temperature.

8. The improved method according to claim 7 in which the unsaturated hydrocarbon is butadiene.

9. The method for the removal of organic peroxide oxygen from a hydrocarbon mixture containing diolefins, which comprises the steps of contacting said diolefinic hydrocarbon mixture with a substantially unoxidized mass of finely divided iron at a temperature of at least 30° C., withdrawing the thus contacted hydrocarbon mixture of substantially lowered peroxide content, stopping further contact of said diolefinic hydrocarbon mixture with the iron surface which has become spent as to its ability to remove peroxide oxygen, thereafter contacting said spent iron surface with sulfuric acid to remove combined oxygen therefrom, washing the thus acid-treated iron surface with water to remove acid therefrom, and again contacting the washed finely divided iron surface free of acid with additional quantities of diolefinic hydrocarbon mixture containing organic peroxide oxygen.

10. A process according to claim 9 in which the principal diolefin in the hydrocarbon mixture is butadiene.

MACK C. FUQUA.
BOWMAN S. GARRETT.

REFERENCES CITED

The following references are of record in the file of this patent:

UNITED STATES PATENTS

| Number | Name | Date |
|---|---|---|
| 2,115,781 | Morrell | May 3, 1938 |
| 2,190,043 | Plummer | Feb. 13, 1940 |
| 2,257,078 | Soday | Sept. 23, 1941 |
| 2,371,342 | Mayfield | Mar. 13, 1945 |
| 2,380,723 | Cunningham | July 31, 1945 |
| 2,426,705 | Patterson et al. | Sept. 2, 1947 |

OTHER REFERENCES

Welch et al.: Ind. Eng. Chem., vol. 39, 826–9 (1947).